No. 825,901. PATENTED JULY 17, 1906.
E. D. GILBERT.
VULCANIZER.
APPLICATION FILED JAN. 23, 1905.

3 SHEETS—SHEET 1.

WITNESSES:

INVENTOR.
Edmund D. Gilbert,
BY Edward F. Simpson, Jr.
ATTORNEY.

No. 825,901. PATENTED JULY 17, 1906.
E. D. GILBERT.
VULCANIZER.
APPLICATION FILED JAN. 23, 1905.

3 SHEETS—SHEET 2.

WITNESSES:

INVENTOR.
Edmund D. Gilbert
BY Edward F. Simpson, Jr.
ATTORNEY.

No. 825,901. PATENTED JULY 17, 1906.
E. D. GILBERT.
VULCANIZER.
APPLICATION FILED JAN. 23, 1905.

3 SHEETS—SHEET 3.

WITNESSES:

INVENTOR.
Edmund D. Gilbert,
BY Edward F. Simpson, Jr.
ATTORNEY

UNITED STATES PATENT OFFICE.

EDMUND D. GILBERT, OF PHILADELPHIA, PENNSYLVANIA, ASSIGNOR TO THE S. S. WHITE DENTAL MANUFACTURING COMPANY, OF PHILADELPHIA, PENNSYLVANIA.

VULCANIZER.

No. 825,901.     Specification of Letters Patent.     Patented July 17, 1906.

Application filed January 23, 1905. Serial No. 242,234.

*To all whom it may concern:*

Be it known that I, EDMUND D. GILBERT, a citizen of the United States, residing at Philadelphia, in the county of Philadelphia and State of Pennsylvania, have invented certain new and useful Improvements in Vulcanizers; and I do hereby declare the following to be a full, clear, and exact description of the invention, such as will enable others skilled in the art to which it appertains to make and use the same.

My invention relates to vulcanizers especially designed for the use of dentists and others for vulcanizing rubber dental plates, &c., the object of my invention being to improve and simplify the vulcanizer forming the subject of my United States Letters Patent No. 614,246, dated November 15, 1898.

The present invention consists in certain improvements, hereinafter described and claimed, in the means for supporting, clamping and unclamping, and handling the lids or covers of vulcanizers.

Figure 1:
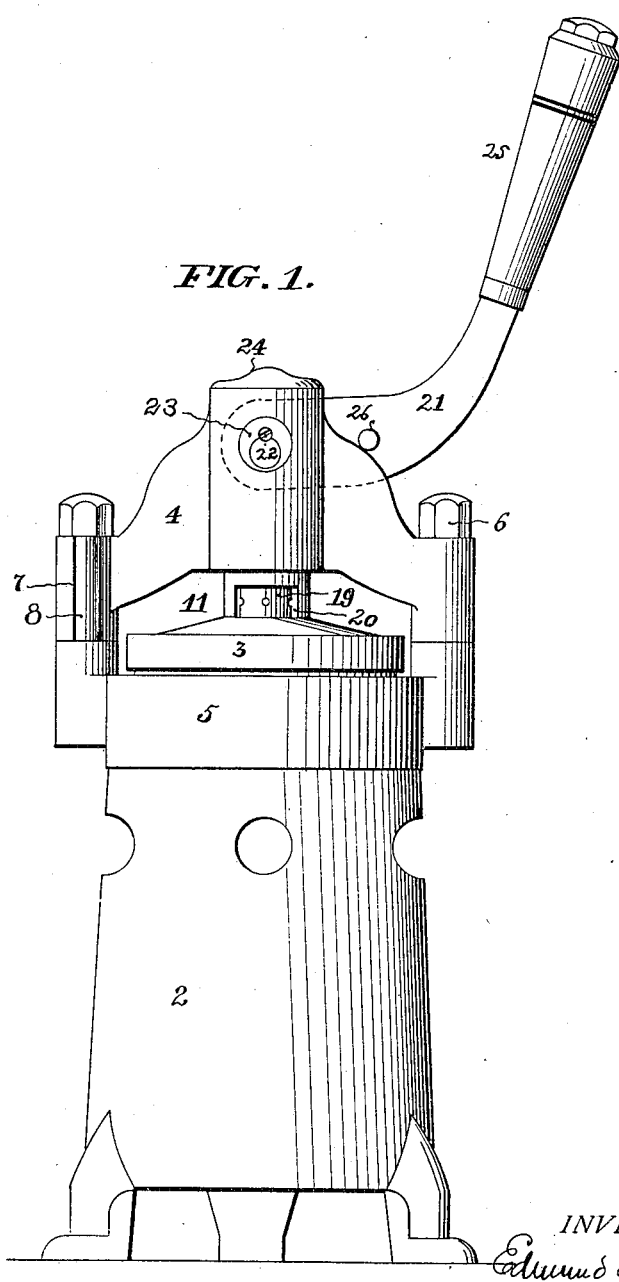
Figure 2:
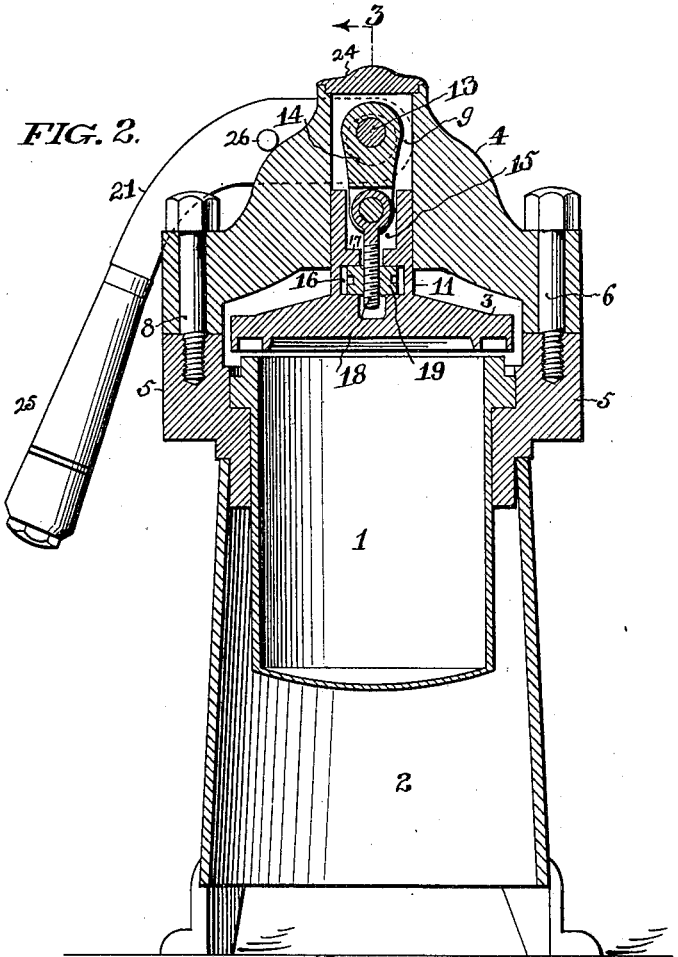
Figure 3:
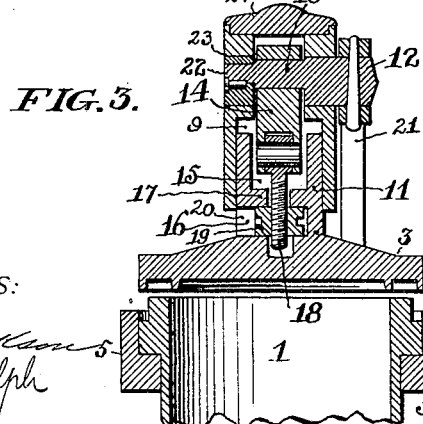
Figure 4:
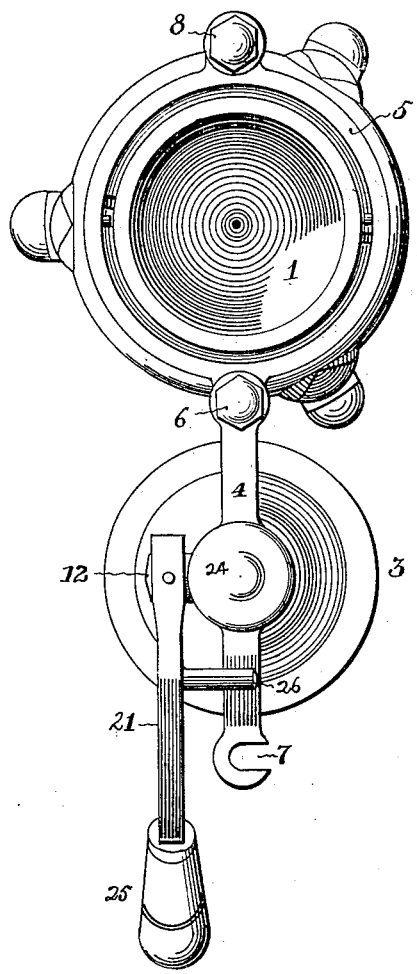

In the accompanying drawings, illustrating an embodiment of the invention, Figure 1 is a view in side elevation, showing the cover as clamped upon the boiler. Fig. 2 is a vertical central sectional view showing the cover unclamped from the boiler and suspended over the same. Fig. 3 is a vertical central sectional view of the cover and its supporting and operating mechanism with the parts in the same position as represented in Fig. 2, but turned at a right angle thereto, the section being taken on the line 3 3 of said Fig. 2. Fig. 4 is a top or plan view showing the cover and its supporting-yoke as swung to one side of the boiler to expose the same.

As the invention relates only to the cover supporting and operating mechanism, it will be unnecessary to describe in detail other features of the vulcanizer. In fact, I have even omitted from the drawings the usually-employed thermometer, blow-off, &c., which form no part of my invention.

In general the vulcanizer consists of a pot or boiler 1, a supporting-jacket 2, a lid or cover 3, and a supporting-yoke 4, to which the lid or cover is secured, the supporting-yoke having connection with a collar 5, mounted upon the jacket.

The cover-supporting yoke 4 is connected at one end to the collar 5 by a vertical pivot-bolt 6, whereby said yoke is capable of being swung horizontally to bring the cover directly over the boiler or to one side thereof. The opposite end of the yoke is formed with a side notch 7, adapted to engage a stop which may be formed by a headed bolt 8, secured to the collar, the purpose of this stop being to center the cover when the same is brought into position over the boiler preparatory to clamping the cover upon said boiler. The cover-supporting yoke is provided with a vertical central opening 9, best formed in an enlargement or hub, the lower portion of said opening being preferably round to receive a correspondingly-shaped stem 11, projecting centrally from the lid or cover 3. A rock-shaft 12 is mounted crosswise in the yoke across the opening 9 and near the upper end thereof, the rock-shaft being formed with an eccentric 13 inside the opening.

A rod 14 connects the eccentric 13 and the stem 11 of the lid, the details of this connection preferably being as follows: The stem 11 is formed with upper and lower chambers 15 and 16, divided by a centrally-perforated partition 17. A threaded bolt 18 is pivoted to the lower end of the eccentric-rod 14 in the upper chamber 15 and passes through the perforation of the partition 17 into the lower chamber 16. On the lower portion of the screw-bolt 18 is a nut 19, which bears against the under side of the partition 17. The lower chamber 16 is open at one side 20 to give access to the nut 19 for operating it.

The rock-shaft 12 at one end projects beyond the side of the yoke, and an operating-lever 21 is made fast to said projecting end. For convenience in assembling the parts the opposite end of the rock-shaft is reduced in diameter at 22 and is connected with a circular piece 23, having bearing in the yoke. The upper open end of the yoke-opening may be closed by a cap 24. The operating-lever is best provided with a wood or other suitable handle 25, and projecting from one side of the operating-lever is a lug or pin 26, designed to limit the movement of said lever in opposite directions by coming in contact with the yoke. I prefer to bend or curve the operating-lever, as shown, in order to reduce the radius or sweep of said lever when the same is swung horizontally. It will be observed that the connection between the cover and the eccentric is located entirely within the yoke-opening, whereby it is protected against steam arising from the boiler and also from dirt.

The operation of my improved vulcanizer-cover supporting and handling mechanism is as follows: When the operating-lever is thrown down with its stop-lug 26 resting upon the yoke, as shown in Fig. 2, the lid or cover is suspended over the boiler and the yoke and cover may be moved to one side of the boiler, as shown in Fig. 4. The boiler is now exposed, and a suitably-packed flask or flasks (not shown) may be placed therein preparatory to the vulcanizing process. Then by means of the operating-lever the yoke may be swung horizontally until its notch 7 engages the stop 8, when the cover is again suspended directly over the boiler, as shown in Fig. 2. The operating-lever is now moved upwardly and forced past the center of the vulcanizer until its stop-lug 26 comes in contact with the opposite side of the yoke, this position being indicated in Fig. 1. This movement of the operating-lever forces the cover down tightly upon the boiler to close the same steam-tight, it being understood that this is accomplished by means of the eccentric 13 acting through the rod 14. After the vulcanizing process is completed and the vulcanizer properly cooled the operating-lever is pulled upwardly and moved to the opposite side of the yoke. (See Fig. 2.) This movement first breaks the connection between the cover and boiler and raises the cover until it clears the boiler, when it may be moved horizontally to one side, Fig. 4, to again expose the boiler for the removal of the flask or flasks.

The operation just described may be effected quickly, easily, and without liability of inaccuracy or uncertainty of movement and without danger of the cover becoming accidentally loosened from the boiler. Thus in closing the vulcanizer it is only necessary to grasp the handle of the operating-lever, swing it horizontally in the proper direction until it comes to a full stop, and then pull it up and over past the center as far as it will go. This in practice is really but a single movement and may be performed quickly. In opening or uncovering the vulcanizer it is only necessary to reverse this simple movement.

Vertical adjustment of the cover independently of the operating-lever may be accomplished by turning the nut 19 on the screw-bolt 18. The object of this adjustment is to provide for taking up wear of the cover-packing and also for varying the extent of compression of the cover as the same may become necessary.

The improved mechanism is not only more easily and quickly operated than the vulcanizer shown in my before-mentioned patent, No. 614,246, but it is also more simple in construction and equally as efficient and safe.

My present invention is not confined to the precise details of construction shown and described, as these are susceptible of more or less modification without departing from the spirit and scope of my invention.

I claim as my invention—

1. The combination, in a vulcanizer, of a boiler, a cover therefor, a cover-supporting yoke pivoted to swing horizontally and having a vertical central opening, an eccentric in said opening, a stem projecting from said cover and movable vertically in said opening, and a link connection inside said opening between said eccentric and said stem, substantially as and for the purpose set forth.

2. The combination, in a vulcanizer, of a boiler, a cover therefor, a cover-supporting yoke pivoted to swing horizontally and having a vertical central opening, an eccentric in said opening, a stem projecting from said cover and movable vertically in said opening, a rod pivoted to said eccentric, a bolt pivoted to said rod, and a nut on said bolt having bearing in said stem, substantially as and for the purpose set forth.

In testimony whereof I affix my signature in presence of two witnesses.

EDMUND D. GILBERT.

Witnesses:
CARRIE E. SHERTZ,
EDWIN STEARNE.